E. G. PORTER.
APPARATUS FOR COATING METAL SHEETS.
APPLICATION FILED MAR. 22, 1918.

1,307,832.

Patented June 24, 1919.
2 SHEETS—SHEET 1.

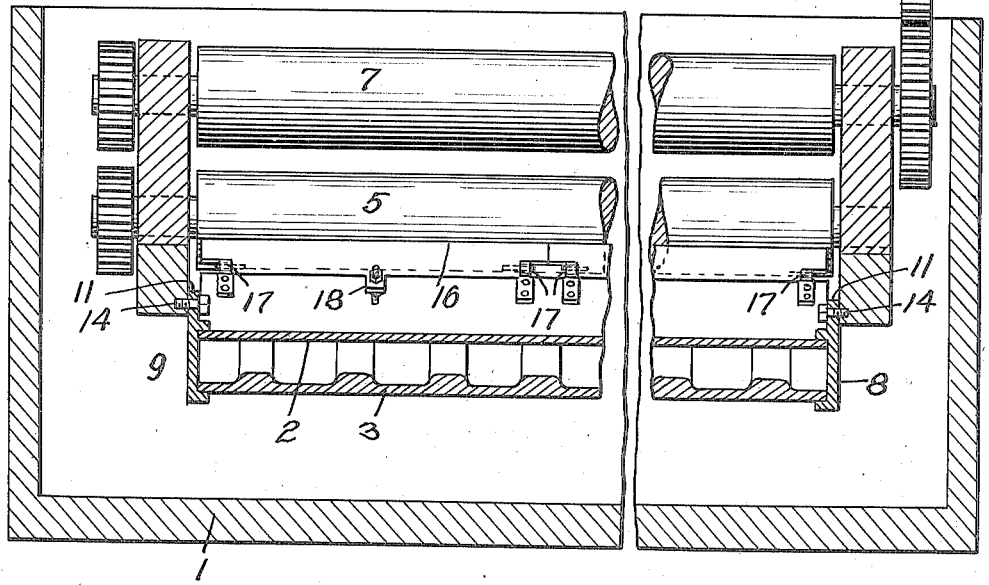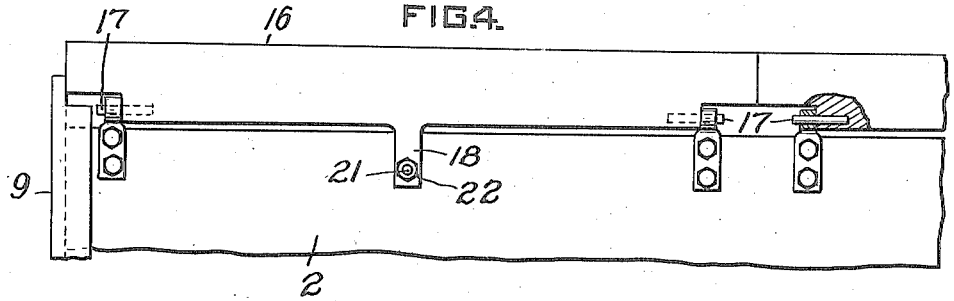

UNITED STATES PATENT OFFICE.

EDGAR G. PORTER, OF WOODLAWN, PENNSYLVANIA.

APPARATUS FOR COATING METAL SHEETS.

1,307,832.

Specification of Letters Patent. Patented June 24, 1919.

Application filed March 22, 1918. Serial No. 224,065.

*To all whom it may concern:*

Be it known that I, EDGAR G. PORTER, residing at Woodlawn, in the county of Beaver and State of Pennsylvania, a citizen of the United States, have invented or discovered certain new and useful Improvements in Apparatus for Coating Metal Sheets, of which improvements the following is a specification.

It is the object of the invention to regulate, and secure uniformity in, the thickness of the layers of coating metal applied upon the opposite faces of the sheet, thus effecting a saving in coating metal, as well as enabling the coating apparatus to be operated at an increased speed. It is particularly applicable to machines for applying a coating of tin to metal plates.

Figure 1:
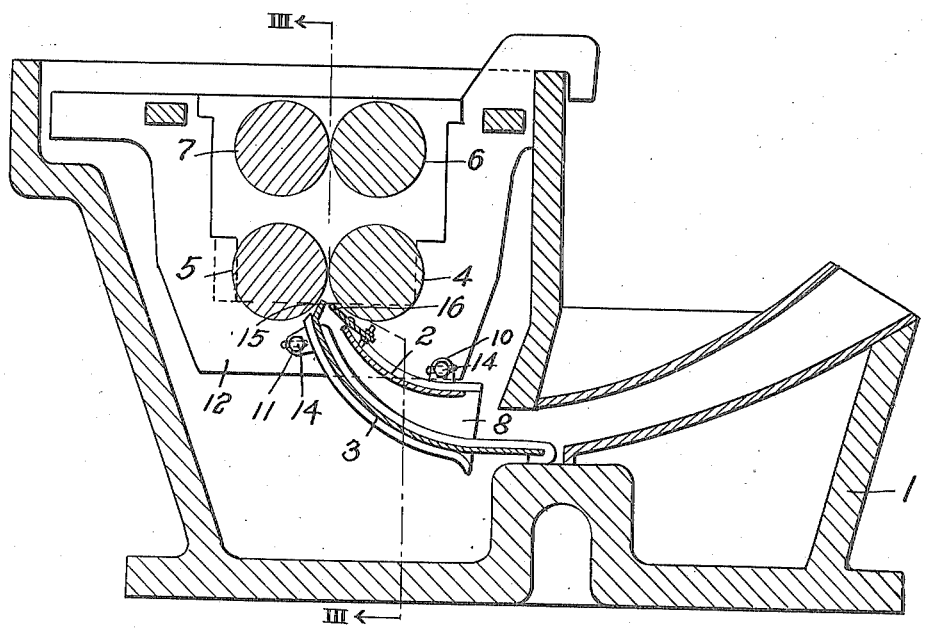
Figure 2:
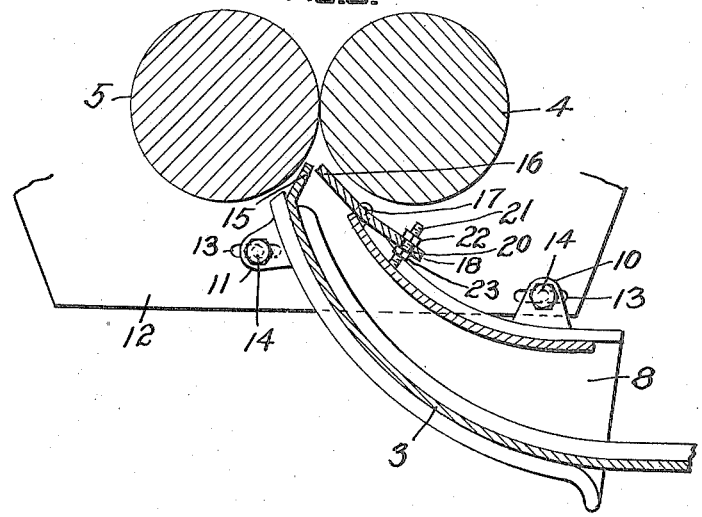

In the accompanying drawings, Figure 1 is a vertical longitudinal section of apparatus embodying the invention; Fig. 2 is a like view in detail upon an enlarged scale; Fig. 3 is a transverse vertical section taken on the line III—III of Fig. 1, (but broken longitudinally); Fig. 4 is a detail view in plan.

A tinning pot 1 of common form is illustrated, into one end of which the sheet is fed through the bath, and between the upper and lower guiding-aprons 2 and 3, to the pairs of delivery rolls 4, 5 and 6, 7.

The upper guiding-apron 2 and the lower guiding-apron 3 are provided at their opposite ends with flanges 8 and 9 respectively, having ears 10 and 11, through which they are bolted to the hangers 12 supported in any suitable way adjacent to the inner faces of the opposite side-walls of the tinning-pot. The hangers 12 are provided with longitudinal slots 13 for the securing bolts 14, so that the upper and lower guiding-aprons and their exit lips may be adjusted relatively to each other.

The lower guiding-apron 3 is provided at its outer end with a preferably integral inwardly-projecting lip 15, the edge of which will lie at or immediately above the surface of the usual oil covering of the tinning bath, and the upper guiding-apron 2 has a coöperating lip 16, which may also be integral therewith, but which is preferably a separate strip adjustably mounted on the outer end of the apron 2, as shown in the drawings. For that purpose the lip or strip 16 is hinged at its opposite ends, as shown at 17, 17 to the apron 2, and is provided with a tail-piece 18 having a perforation 20 at its free end of a size sufficient to permit its vertical adjustment along the threaded pin 21 mounted on the upper-surface of the apron 2. Upper and lower nuts 22, 23 on the pin 21 serve to secure the strip 16 in the desired adjusted coöperative relation, with the lip 15 of the lower guiding-apron 3. A single strip 16 may be used, extending from one side to the other of the tinning-pot, but it is preferred to divide the strip into a number of adjacent independently supported adjustable sections, as shown in Figs. 3 and 4.

The lips 15 and 16 are arranged and intended to bear upon the opposite faces of the coated sheet as it emerges from the bath, and thus scrape off any surplus of tin and render the coating smooth and uniform.

The tinning pot and delivery mechanism have not been described in detail, since these are well known, and may be of any suitable form. It will also be understood that the specific embodiment of the invention herein illustrated may be varied without essential departure.

I claim as my invention:

In apparatus for coating metal sheets, the combination with a coating-pot adapted to contain a bath of the coating substance, of a pair of relatively adjustable guiding-aprons provided with lips adapted to bear upon the opposite surfaces of the coated sheet as it emerges from the bath, at least one of said lips, being adjustable relatively to its apron, and means for securing the adjustable lip in adjusted position.

In testimony whereof I have hereunto set my hand.

EDGAR G. PORTER.

Witnesses:
MARSHALL A. CHRISTY,
FRANCIS J. TOMASSON.